United States Patent
Moon

(10) Patent No.: US 11,533,275 B2
(45) Date of Patent: *Dec. 20, 2022

(54) METHOD AND APPARATUS FOR ALLOCATING SERVER IN WIRELESS COMMUNICATION SYSTEM

(71) Applicant: Samsung Electronics Co., Ltd., Suwon-si (KR)

(72) Inventor: Jicheol Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

This patent is subject to a terminal disclaimer.

(21) Appl. No.: 17/030,897

(22) Filed: Sep. 24, 2020

(65) Prior Publication Data

US 2021/0006507 A1 Jan. 7, 2021

Related U.S. Application Data

(63) Continuation of application No. 14/980,584, filed on Dec. 28, 2015, now Pat. No. 10,791,064.

(30) Foreign Application Priority Data

Dec. 31, 2014 (KR) .................. 10-2014-0195468

(51) Int. Cl.
| | | |
|---|---|---|
| *H04L 47/70* | (2022.01) |
| *H04W 4/02* | (2018.01) |
| *H04L 61/4511* | (2022.01) |
| *H04L 67/52* | (2022.01) |
| *H04L 67/56* | (2022.01) |
| *H04L 67/563* | (2022.05) |
| *H04L 45/12* | (2022.01) |

(52) U.S. Cl.
CPC ........ *H04L 47/829* (2013.01); *H04L 61/4511* (2022.05); *H04L 67/52* (2022.05); *H04L 67/56* (2022.05); *H04L 67/563* (2022.05); *H04W 4/023* (2013.01); *H04L 45/126* (2013.01)

(58) Field of Classification Search
CPC ... H04L 47/829; H04L 61/1511; H04L 67/18; H04L 67/28; H04L 67/2814; H04L 45/126; H04W 4/023
USPC ....................................................... 706/226
See application file for complete search history.

(56) References Cited

U.S. PATENT DOCUMENTS

| | | |
|---|---|---|
| 5,889,770 A | 3/1999 | Jokiaho et al. |
| 7,475,160 B1 | 1/2009 | Shah et al. |
| 7,693,959 B2 | 4/2010 | Leighton et al. |
| 8,275,873 B2 | 9/2012 | Josefsberg et al. |

(Continued)

OTHER PUBLICATIONS

Chinese Office Action dated Oct. 8, 2019, issued in Chinese Application No. 201580070012.4.

*Primary Examiner* — Jeffrey R Swearingen
(74) *Attorney, Agent, or Firm* — Jefferson IP Law, LLP

(57) ABSTRACT

A method and an apparatus for allocating a server to a terminal are provided. The method includes receiving an Internet protocol (IP) packet with a domain name system (DNS) query from a terminal, including terminal location information in the IP packet, transmitting the IP packet to a DNS server, receiving, from the DNS server, a response IP packet location information of a proximity server, the proximity server being located within a certain distance from the terminal, and transmitting the response IP packet to the terminal.

24 Claims, 10 Drawing Sheets

(56) References Cited

U.S. PATENT DOCUMENTS

| | | |
|---|---|---|
| 8,279,748 B2 | 10/2012 | Foxworthy et al. |
| 8,280,998 B2 | 10/2012 | Joshi |
| 8,284,774 B2 | 10/2012 | Roberts et al. |
| 8,285,701 B2 | 10/2012 | Swart et al. |
| 8,291,083 B2 | 10/2012 | Black et al. |
| 8,291,117 B1 | 10/2012 | Eggleston et al. |
| 8,307,003 B1 | 11/2012 | Sheth et al. |
| 8,316,085 B2 | 11/2012 | Jeon et al. |
| 8,321,588 B2 | 11/2012 | Richardson et al. |
| 8,321,943 B1 | 11/2012 | Walters et al. |
| 8,325,739 B2 | 12/2012 | Van De Poel et al. |
| 8,331,288 B2 | 12/2012 | Dhanapal et al. |
| 8,331,353 B2 | 12/2012 | Wilkes et al. |
| 8,332,484 B2 | 12/2012 | Afergan et al. |
| 8,335,765 B2 | 12/2012 | Sivasubramanian et al. |
| 8,339,901 B2 | 12/2012 | Haupt et al. |
| 8,341,250 B2 | 12/2012 | Pritikin et al. |
| 8,341,297 B2 | 12/2012 | Swildens et al. |
| 8,352,580 B2 | 1/2013 | Lee et al. |
| 8,359,649 B1 | 1/2013 | Sobel et al. |
| 8,364,785 B2 | 1/2013 | Plamondon |
| 8,369,882 B1 | 2/2013 | Manroa et al. |
| 8,370,933 B1 | 2/2013 | Buckler |
| 8,370,940 B2 | 2/2013 | Holloway et al. |
| 8,374,586 B2 | 2/2013 | Bentkovski et al. |
| 8,375,120 B2 | 2/2013 | Rand et al. |
| 8,379,835 B1 | 2/2013 | Williams et al. |
| 8,380,167 B2 | 2/2013 | Pummill et al. |
| 8,380,851 B2 | 2/2013 | McCarthy et al. |
| 8,391,274 B2 | 3/2013 | Choo et al. |
| 8,392,421 B1 | 3/2013 | Nucci et al. |
| 8,392,451 B1 | 3/2013 | Pierce et al. |
| 8,392,539 B1 | 3/2013 | Chen et al. |
| 8,392,611 B2 | 3/2013 | Leighton et al. |
| 8,402,100 B2 | 3/2013 | Addante et al. |
| 8,402,144 B2 | 3/2013 | Speicher et al. |
| 8,406,141 B1 | 3/2013 | Couturier et al. |
| 8,406,170 B2 | 3/2013 | Rune |
| 8,407,169 B2 | 3/2013 | Hofford |
| 8,407,247 B2 | 3/2013 | Cohen et al. |
| 8,417,824 B2 | 4/2013 | Raciborski et al. |
| 8,422,405 B2 | 4/2013 | Ho |
| 8,423,667 B2 | 4/2013 | Richardson et al. |
| 8,423,672 B2 | 4/2013 | Liu et al. |
| 8,424,026 B1 | 4/2013 | Cottrell |
| 8,424,074 B2 | 4/2013 | Cyprus et al. |
| 8,428,036 B2 | 4/2013 | Herscovici et al. |
| 8,428,592 B2 | 4/2013 | Lundqvist et al. |
| 8,429,734 B2 | 4/2013 | Agbabian et al. |
| 8,438,291 B2 | 5/2013 | Davis et al. |
| 8,442,011 B1 | 5/2013 | Faccin |
| 8,447,836 B2 | 5/2013 | Mahalal et al. |
| 8,448,237 B2 | 5/2013 | Rice et al. |
| 8,453,211 B2 | 5/2013 | Huo et al. |
| 8,457,016 B2 | 6/2013 | Krishnamurthy et al. |
| 8,458,298 B2 | 6/2013 | Josefsberg et al. |
| 8,458,301 B1 | 6/2013 | Andrus et al. |
| 8,458,360 B2 | 6/2013 | Richardson et al. |
| 8,462,440 B2 | 6/2013 | Eguchi et al. |
| 8,463,877 B1 | 6/2013 | Richardson et al. |
| 8,463,915 B1 | 6/2013 | Kim |
| 8,467,386 B2 | 6/2013 | Kaya et al. |
| 8,468,222 B2 | 6/2013 | Sakata et al. |
| 8,468,247 B1 | 6/2013 | Richardson et al. |
| 8,473,338 B2 | 6/2013 | Stahura et al. |
| 8,473,634 B2 | 6/2013 | Satagopan et al. |
| 8,478,903 B2 | 7/2013 | Farber et al. |
| 8,484,319 B2 | 7/2013 | Wein et al. |
| 8,493,896 B2 | 7/2013 | Lu et al. |
| 8,494,911 B2 | 7/2013 | White et al. |
| 8,495,183 B2 | 7/2013 | Tukol et al. |
| 8,498,281 B2 | 7/2013 | Maki |
| 8,504,721 B2 | 8/2013 | Hsu et al. |
| 8,509,095 B2 | 8/2013 | Ormazabal |
| 8,510,411 B2 | 8/2013 | Coulson et al. |
| 8,510,428 B2 | 8/2013 | Joshi |
| 8,510,434 B2 | 8/2013 | Wang et al. |
| 8,510,464 B2 | 8/2013 | Dharmistan |
| 8,510,758 B1 | 8/2013 | Harris |
| 8,515,995 B2 | 8/2013 | Keohane et al. |
| 8,516,158 B1 | 8/2013 | Wu et al. |
| 8,521,667 B2 | 8/2013 | Zhu et al. |
| 8,521,851 B1 | 8/2013 | Richardson et al. |
| 8,521,880 B1 | 8/2013 | Richardson et al. |
| 8,521,885 B1 | 8/2013 | Richardson et al. |
| 8,521,908 B2 | 8/2013 | Holmes et al. |
| 8,522,336 B2 | 8/2013 | Lin et al. |
| 8,526,360 B1 | 9/2013 | Breau et al. |
| 8,526,405 B2 | 9/2013 | Curtis et al. |
| 8,526,968 B2 | 9/2013 | Alles et al. |
| 8,527,631 B1 | 9/2013 | Liang |
| 8,527,635 B2 | 9/2013 | Jeon et al. |
| 8,533,361 B1 | 9/2013 | Roskind |
| 8,533,758 B2 | 9/2013 | Ruiz-Velasco |
| 8,533,822 B2 | 9/2013 | Byrnes |
| 8,538,028 B2 | 9/2013 | Yeap et al. |
| 8,544,069 B1 | 9/2013 | Subbiah et al. |
| 8,548,500 B2 | 10/2013 | Lamba et al. |
| 8,549,609 B2 | 10/2013 | Horman et al. |
| 8,549,611 B2 | 10/2013 | Judge et al. |
| 8,550,903 B2 | 10/2013 | Lyons et al. |
| 8,554,933 B2 | 10/2013 | Delos Reyes et al. |
| 8,559,321 B2 | 10/2013 | Giaretta et al. |
| 8,560,604 B2 | 10/2013 | Shribman et al. |
| 8,560,818 B2 | 10/2013 | Tukol et al. |
| 8,566,443 B2 | 10/2013 | Tola et al. |
| 8,566,838 B2 | 10/2013 | Sabin et al. |
| 8,566,936 B2 | 10/2013 | Chesla |
| 8,571,038 B2 | 10/2013 | Miller et al. |
| 8,572,204 B2 | 10/2013 | Morrison et al. |
| 8,572,248 B2 | 10/2013 | McGuire et al. |
| 8,572,431 B2 | 10/2013 | Alder et al. |
| 8,572,737 B2 | 10/2013 | Holloway et al. |
| 8,576,845 B2 | 11/2013 | Csaszar et al. |
| 8,577,992 B1 | 11/2013 | Richardson et al. |
| 8,577,997 B2 | 11/2013 | Thomson et al. |
| 8,578,166 B2 | 11/2013 | De Monseignat et al. |
| 8,582,565 B1 | 11/2013 | Morsy et al. |
| 8,583,749 B2 | 11/2013 | Neal et al. |
| 8,589,541 B2 | 11/2013 | Raleigh et al. |
| 8,594,723 B2 | 11/2013 | Jain et al. |
| 8,595,106 B2 | 11/2013 | Morris |
| 8,595,329 B2 | 11/2013 | Kleinfelter et al. |
| 8,595,758 B2 | 11/2013 | Taylor et al. |
| 8,599,126 B2 | 12/2013 | Chang et al. |
| 8,601,160 B1 | 12/2013 | Sargent |
| 8,606,222 B2 | 12/2013 | Agarwal et al. |
| 8,606,926 B2 | 12/2013 | Ulevitch |
| 8,612,550 B2 | 12/2013 | Yoo et al. |
| 8,612,556 B2 | 12/2013 | Durand et al. |
| 8,612,572 B2 | 12/2013 | Hayes et al. |
| 8,612,862 B2 | 12/2013 | Mascarenhas et al. |
| 8,616,958 B2 | 12/2013 | Hermansen et al. |
| 8,619,626 B2 | 12/2013 | Schneyer et al. |
| 8,620,999 B1 | 12/2013 | L'Heureux et al. |
| 8,621,086 B2 | 12/2013 | Purzynski |
| 8,625,461 B2 | 1/2014 | Maki |
| 8,631,489 B2 | 1/2014 | Antonakakis et al. |
| 8,634,346 B2 | 1/2014 | Velandy et al. |
| 8,635,128 B2 | 1/2014 | Fan et al. |
| 8,635,367 B2 | 1/2014 | Verzunov et al. |
| 8,638,765 B2 | 1/2014 | Prakash et al. |
| 8,645,477 B2 | 2/2014 | Katis et al. |
| 8,645,501 B2 | 2/2014 | Ghosh et al. |
| 8,645,509 B2 | 2/2014 | Carriere et al. |
| 8,645,539 B2 | 2/2014 | McCarthy et al. |
| 8,645,565 B2 | 2/2014 | Sparks et al. |
| 8,645,570 B2 | 2/2014 | Foote et al. |
| 8,646,058 B2 | 2/2014 | Niwata et al. |
| 8,646,071 B2 | 2/2014 | Pereira et al. |
| 8,654,127 B2 | 2/2014 | Kenttala et al. |
| 8,655,782 B2 | 2/2014 | Poon et al. |
| 8,667,156 B2 | 3/2014 | Soliman et al. |
| 8,671,221 B2 | 3/2014 | Shribman et al. |

(56) References Cited

U.S. PATENT DOCUMENTS

| | | |
|---|---|---|
| 8,676,655 B2 | 3/2014 | White et al. |
| 8,676,918 B2 | 3/2014 | Richardson et al. |
| 8,677,018 B2 | 3/2014 | Roskind |
| 8,688,644 B1 | 4/2014 | Tyurin et al. |
| 8,688,802 B2 | 4/2014 | Sureshchandra et al. |
| 8,688,837 B1 | 4/2014 | Richardson et al. |
| 8,693,454 B2 | 4/2014 | Annamalai et al. |
| 8,694,642 B2 | 4/2014 | Dempsky et al. |
| 8,694,645 B2 | 4/2014 | Mason et al. |
| 8,700,657 B2 | 4/2014 | Frett et al. |
| 8,700,729 B2 | 4/2014 | Dua |
| 8,700,888 B2 | 4/2014 | Tukol et al. |
| 8,701,165 B2 | 4/2014 | Krivosheev et al. |
| 8,706,825 B2 | 4/2014 | Huang et al. |
| 8,707,387 B2 | 4/2014 | Gasparini et al. |
| 8,707,393 B2 | 4/2014 | Grube et al. |
| 8,711,858 B2 | 4/2014 | Watanabe |
| 8,713,188 B2 | 4/2014 | Treuhaft |
| 8,717,931 B2 | 5/2014 | Taniuchi et al. |
| 8,719,876 B2 | 5/2014 | Kotecha et al. |
| 8,719,919 B2 | 5/2014 | Rice et al. |
| 8,725,888 B2 | 5/2014 | Short et al. |
| 8,725,997 B2 | 5/2014 | Tukol et al. |
| 8,732,268 B2 | 5/2014 | Huang et al. |
| 8,732,309 B1 | 5/2014 | Richardson et al. |
| 8,745,195 B1 | 6/2014 | Presotto et al. |
| 8,745,703 B2 | 6/2014 | Lambert et al. |
| 8,750,265 B2 | 6/2014 | Scherzer et al. |
| 8,750,884 B1 | 6/2014 | Gorman et al. |
| 8,751,601 B2 | 6/2014 | Edge et al. |
| 8,751,613 B1 | 6/2014 | Medved et al. |
| 8,751,627 B2 | 6/2014 | Liu et al. |
| 8,751,863 B2 | 6/2014 | Calder et al. |
| 8,755,793 B2 | 6/2014 | Ulupinar et al. |
| 8,756,306 B1 | 6/2014 | Whitsett et al. |
| 8,756,340 B2 | 6/2014 | Christian et al. |
| 8,756,341 B1 | 6/2014 | Richardson et al. |
| 8,762,506 B2 | 6/2014 | Courtney et al. |
| 8,762,571 B2 | 6/2014 | Adelman et al. |
| 8,762,573 B2 | 6/2014 | Robinson |
| 8,767,590 B2 | 7/2014 | Tseng |
| 8,768,918 B2 | 7/2014 | Clary et al. |
| 8,769,043 B2 | 7/2014 | Flitcroft |
| 8,769,057 B1 | 7/2014 | Breau et al. |
| 8,769,118 B2 | 7/2014 | Raciborski et al. |
| 2007/0177499 A1 | 8/2007 | Gavrilescu et al. |
| 2007/0283026 A1 | 12/2007 | Lohmar et al. |
| 2008/0086574 A1 | 4/2008 | Raciborski et al. |
| 2008/0160972 A1 | 7/2008 | Haran et al. |
| 2008/0320151 A1 | 12/2008 | McCanne et al. |
| 2009/0144400 A1 | 6/2009 | Kunito |
| 2010/0042725 A1* | 2/2010 | Jeon .................. H04L 67/1021 709/219 |
| 2012/0178416 A1 | 7/2012 | Miklos et al. |
| 2012/0196601 A1* | 8/2012 | Lundqvist .......... H04L 61/1511 455/435.2 |
| 2013/0198387 A1 | 8/2013 | Swildens et al. |
| 2013/0297596 A1 | 11/2013 | Mouline et al. |
| 2013/0304887 A1* | 11/2013 | Cherian ................ H04L 63/08 709/223 |
| 2017/0250952 A1 | 8/2017 | Westberg et al. |

\* cited by examiner

METHOD AND APPARATUS FOR ALLOCATING SERVER IN WIRELESS COMMUNICATION SYSTEM

CROSS-REFERENCE TO RELATED APPLICATION(S)

This application is a continuation application of prior application Ser. No. 14/980,584, filed on Dec. 28, 2015, which has issued as U.S. Pat. No. 10,791,064 on Sep. 29, 2020 and is based on and claims priority under 35 U.S.C § 119(a) of a Korean patent application number 10-2014-0195468, filed on Dec. 31, 2014, in the Korean Intellectual Property Office, the disclosure of which is incorporated by reference herein in its entirety

TECHNICAL FIELD

The present disclosure relates to a server allocation system. More particularly, the present disclosure relates to a method and apparatus for allocating a server closest to a terminal (i.e., a proximity server).

BACKGROUND

In recent years, the development of communication technology has led to various types of terminals (electronic devices) that access the Internet. Terminals need Internet protocol (IP) addresses to access the Internet. When a domain name address is input to a terminal, the transmission control protocol (TCP)/IP network converts the domain name address into the IP address by using a domain name server (DNS) and allows the terminal to access the website.

When domain name servers are installed in cell sites, the terminal user can experience a high quality of service and the communication service provider can also reduce the network load.

Although DNS servers of the related art can distinguish between Internet service providers (ISPs) from the IP address of DNS messages, such DNS servers cannot distinguish between locations of cell sites.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a system for allocating a server closest to a terminal (i.e., a proximity server) to the terminal by using the location information regarding the terminal.

In accordance with an aspect of the present disclosure, a location-information transmitting apparatus for allocating a server to a terminal is provided. The location-information transmitting apparatus includes a communication unit configured to communicate with other network entities, and a controller configured to receive an Internet protocol (IP) packet with a domain name system (DNS) query from the terminal, include terminal location information in the IP packet, transmit the IP packet to a DNS server, received, from the DNS server, a response IP packet with location information of a proximity server, the proximity server being located within a certain distance from the terminal, and transmit the response IP packet to the terminal.

In accordance with another aspect of the present disclosure, a DNS server for allocating a server to a terminal is provided. The DNS server includes a communication unit configured to communicate with other network entities, and a controller configured to control the communication unit to receive an IP packet with terminal location information from a location-information transmitting apparatus, and control the communication unit to transmit, to a location-information transmitting apparatus, a response IP packet with location information of a proximity server based on the terminal location information, the proximity server being located in a certain distance from the terminal.

In accordance with another aspect of the present disclosure, a method for a location-information transmitting apparatus to allocate a server to a terminal is provided. The method includes receiving an IP packet with a DNS query from the terminal, including terminal location information in the IP packet, transmitting the IP packet to a DNS server, and receiving, from the DNS server, a response IP packet with location information of a proximity server, the proximity server being located within a certain distance from the terminal, and transmitting the response IP packet to the terminal.

In accordance with another aspect of the present disclosure, a method for a DNS server to allocate a server to a terminal is provided. The method includes receiving an IP packet with terminal location information from a location-information transmitting apparatus, and transmitting, to the location-information transmitting apparatus, a response IP packet with location information of a proximity server based on the terminal location information, the proximity server being located within a certain distance from the terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Any particular terminology describing certain features or aspects of the present disclosure is not suggestive of language restricted to any specific characteristics, features, or aspects of the present disclosure with which that terminology is associated.

Figure 1:
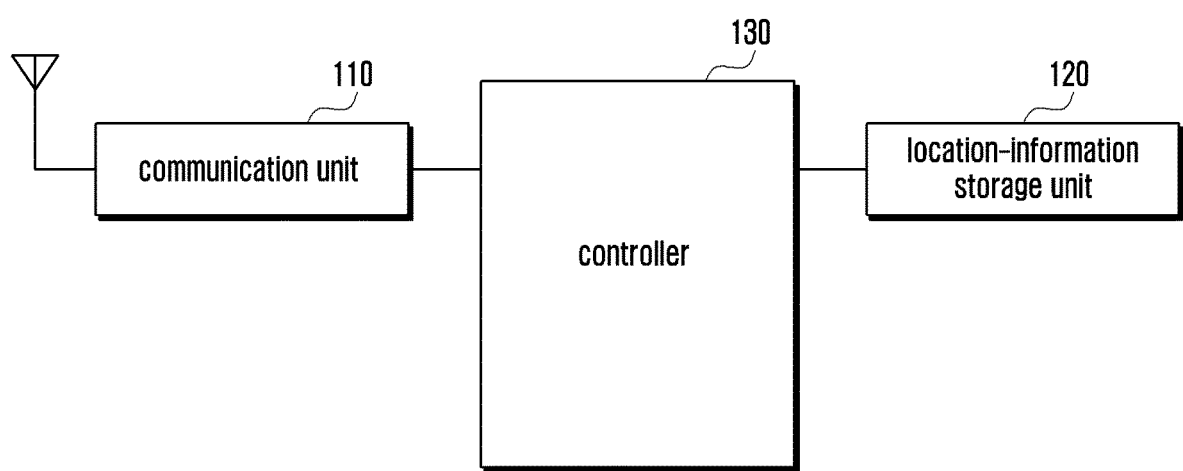
FIG. 1 is a block diagram of apparatus for transmitting location-information according to an embodiment of the present disclosure.

FIG. 1 is a block diagram of an apparatus for transmitting location-information according to an embodiment of the present disclosure.

Referring to FIG. 1, the location-information transmitting apparatus includes a communication unit 110, a location-information storage unit 120 and a controller 130.

The communication unit 110 performs transmission/reception of data to access a network server. The communication unit 110 is capable of receiving Internet protocol (IP) packets from a terminal. The communication unit 110 is capable of inserting the terminal location information into the IP packet and transmitting the IP packet to a domain name system (DNS) server. The communication unit 110 is capable of receiving the IP packet from the DNS server and transmitting the IP packet to the terminal.

In order to include terminal location information in the IP packets, the communication unit 110 is capable of receiving location-information of the terminal from another network entity.

The location-information storage unit 120 is capable of storing location-information of a terminal that is transmitted from the communication unit 110. The storage unit 120 is also capable of storing location-information of a terminal that is created in the controller 130.

The location information of a terminal may include a cell identifier where a terminal is located, a base station identifier of a cell where a terminal is located, or a latitude and a longitude of where a terminal is located, etc. The terminal location information may also include an IP address of a proximity server, cell-site location information, geographical location information of a terminal, identifiers of the location information, etc.

The location information of a terminal may be transmitted from another network entity to the location-information transmitting apparatus. The location information of a terminal may be created by the controller 130.

The controller 130 controls all the operations of the apparatus according to an embodiment of the present disclosure. When the controller 130 receives an IP packet from a terminal, it is capable of inserting the terminal location information from another network entity into the IP packet. The controller 130 is also capable of creating the terminal location information and including the created location information in the IP packet received from the terminal. The controller 130 is capable of performing control operations to transmit the IP packet including the terminal location information to a DNS server.

The terminal location information may include at least one of: an IP address of a proximity server, a cell-site location information, geographical location information of a terminal, and identifiers of the location information.

The proximity server refers to a cell site server closest to a terminal and the detailed description will be explained later.

Figure 2:
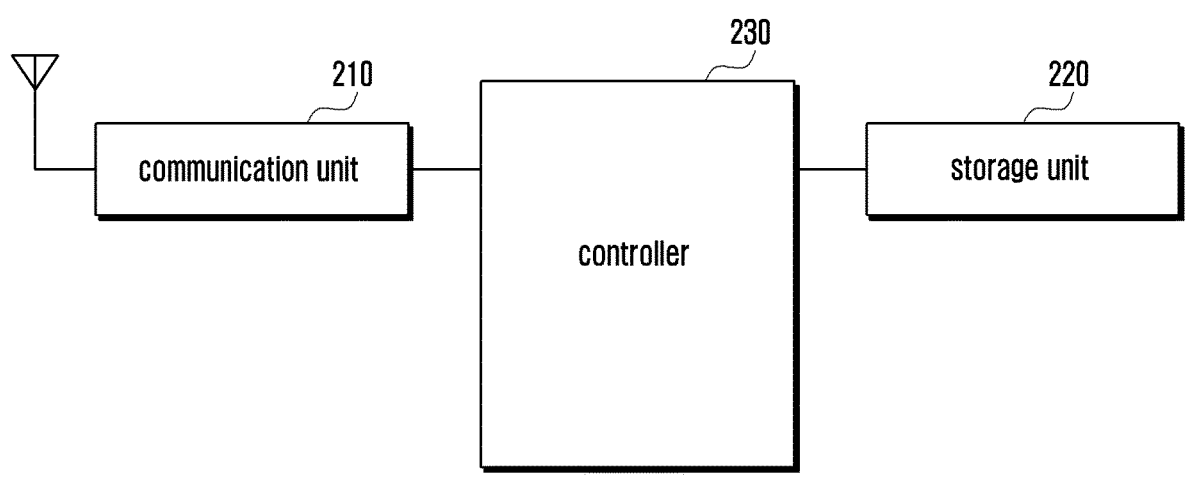
FIG. 2 is a block diagram of a domain name system (DNS) server according to an embodiment of the present disclosure.

FIG. 2 is a block diagram of a DNS server according to an embodiment of the present disclosure.

Referring to FIG. 2, the DNS server is capable of including a communication unit 210, a storage unit 220 and a controller 230.

The communication unit 210 is capable of receiving IP packets from a terminal and transmitting the response IP packets corresponding to the received IP packets to the terminal. The communication unit 210 is capable of receiving IP packets transmitted from another network entity.

The storage unit 220 is capable of storing IP information of an IP address corresponding to a domain name. When a user inputs a domain name into the terminal, the domain name is converted into an IP address and the IP address is transmitted to the terminal.

The IP information may include a number of IP addresses corresponding to the same domain name. That is, a number of servers with the same domain name may exist, and the respective IP addresses may be stored in the storage unit 220.

The controller 230 receives IP packets from a terminal and creates packets corresponding to the received IP packets, which are referred to as response IP packets.

The response IP packets may include an IP address of a server within a certain distance from the terminal. In the embodiment of the present disclosure, a server within a certain distance from the terminal refers to a server closest to the terminal. That is, the controller 230 is capable of creating the response IP packet including an IP address of a server closest to a user, using the terminal location included in the received IP packet, from among the IP addresses of servers corresponding to a domain name. The controller 230 is capable of transmitting the response IP packets to the terminal.

Figure 3:
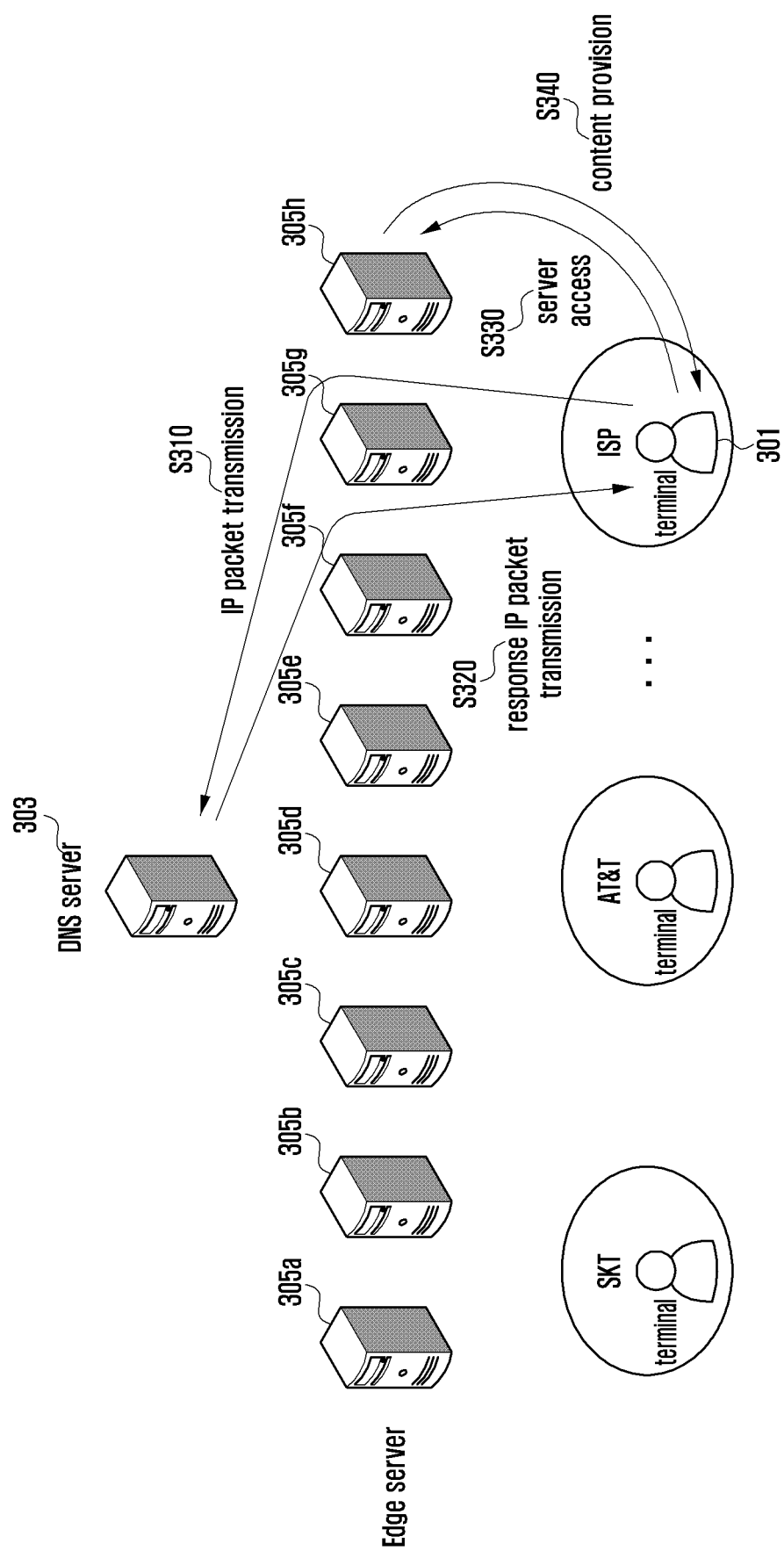
FIG. 3 is a diagram illustrating a method for providing content to a terminal by using a DNS server and an edge server according to an embodiment of the present disclosure.

FIG. 3 is a diagram illustrating a method for providing content to a terminal by using a DNS server and an edge server according to an embodiment of the present disclosure.

With the development of communication technology, a various type of terminals (electronic devices) have been released, so that users can access the Internet using the terminals.

Users can access the Internet by using terminals such as, for example, smartphones, tablets, etc., as well as computers.

Referring to FIG. 3, a user inputs a domain name into a terminal 301 to access a particular website over the Internet. The domain name may be previously specified according to the Internet servers. For example, to access a server of the Korean Intellectual Patent Office, the pre-specified domain name, www.kipo.go.kr, is input to the terminal. When a domain name is input to the terminal 301, an IP packet including a DNS query is transmitted to the DNS server in operation S310.

Figure 6:
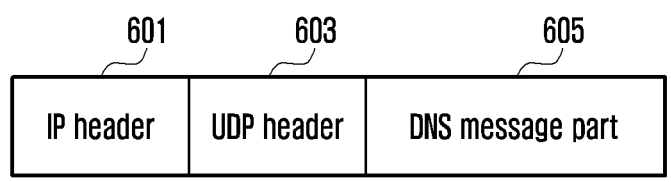
FIG. 6 is a structure of an Internet protocol (IP) packet including a DNS query according to an embodiment of the present disclosure.

FIG. 6 is a structure of an Internet protocol (IP) packet including a DNS query according to an embodiment of the present disclosure.

Referring to FIG. 6, an IP packet may include an IP header 601, a user datagram protocol (UDP) header 603, and a DNS message part 605 including a DNS query or DNS response message.

The IP header 601 includes an IP address of a terminal transmitting IP packets and an IP address of a destination to receive the IP packets. When a terminal performs transmission of IP packets, the IP packets are transmitted to the destination via the destination IP address included in the IP header. When a server receives the IP packets, it may transmit the response for the received IP packets to the terminal via the terminal IP address included in the IP header.

The IP address may be included in the UDP header 603 or the DNS message part 605.

Referring back to FIG. 3, the IP packets transmitted from the terminal may be transmitted to the DNS server 303 that provides content delivery network (CDN) services.

The DNS server 303 is capable of storing IP addresses of respective domain names. When receiving a domain name included in an IP packet, the DNS server 303 is capable of transmitting, to the terminal, the response IP packet including an IP address associated with a domain name in operation S320. When there are multiple IP addresses corresponding to the domain name, the response IP packet may include an IP address of a server closest to the terminal is transmitted to the terminal.

A mobile communication network may include edge servers 305a to 305h to provide CDN services, as well as a DNS server 303. The edge servers provide fast network services to users and reduce the load of network. For example, when a network has one DNS server, the network load increases and the quality of services to users decreases. These problems can be resolved by installing a number of edge servers in the network.

Therefore, the DNS server 303 is capable of allocating an edge server, which is closest to a terminal, to the terminal, from among the IP addresses corresponding to the received domain name.

In order to allocate an edge server closest to a terminal to the terminal, the DNS server 303 is capable of determining an edge server closest to a terminal, based on an IP address of the terminal included in the received IP packet, and IP bandwidths assigned to Internet service providers (ISPs), and allocating the edge server to the terminal.

When the DNS server 303 is implemented with a number of DNS servers and the DNS server 303 that received an IP packet has not stored the IP address corresponding to the domain name, the DNS server 303 may transmit the received IP packet to another DNS server. The DNS server 303 may also transmit information that can derive information included in the IP packet.

When the DNS server 303 transmits the response IP packet to the terminal 301, the terminal 301 is capable of accessing the edge server using the IP address included in the response IP packet in operation S330. The edge server 305h that is allocated to the terminal 301 is then capable of providing content to the terminal in operation S340.

Figure 4:
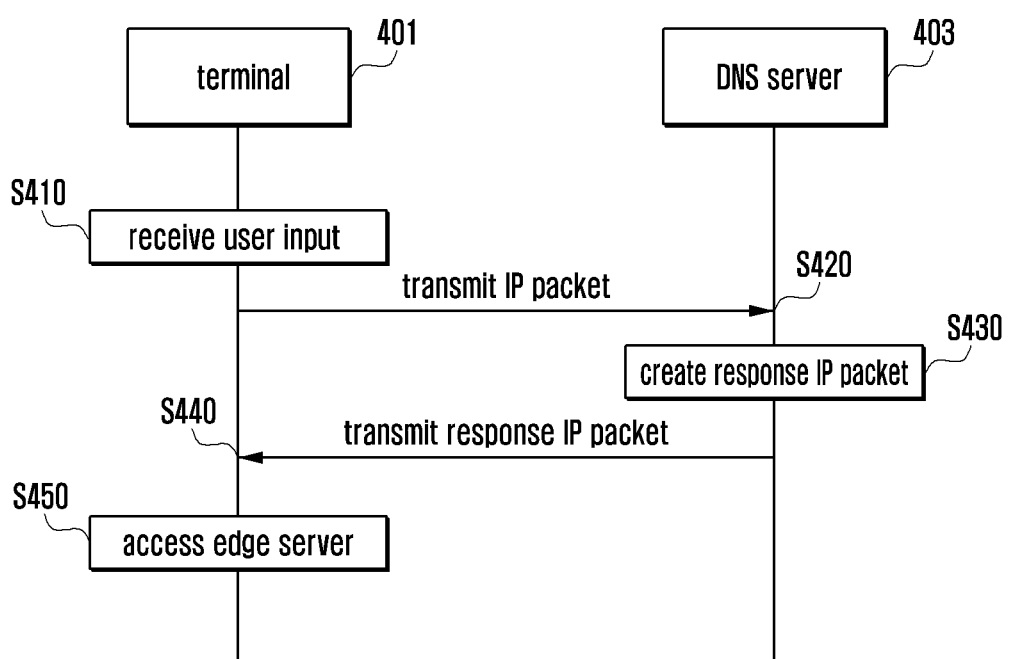
FIG. 4 is a flow diagram illustrating a method for providing content to a terminal by using a DNS server and an edge server according to an embodiment of the present disclosure.

FIG. 4 is a flow diagram illustrating a method for providing content to a terminal by using a DNS server and an edge server according to an embodiment of the present disclosure.

Referring to FIG. 4, the terminal 401 is capable of receiving a user input in operation S410. The user input may include a domain name to access a particular server and to receive content therefrom.

The terminal 401 transmits an IP packet including the domain name to a DNS server 403 in operation S420.

The IP packet transmitted to the DNS server 403 may include the IP address of the terminal 401, and the IP address of a destination to receive the IP packet, as well as the user's input domain name.

The IP packet is transmitted from the terminal 401 to the DNS server 403 corresponding to the IP address of a destination.

The DNS server 403 receives the IP packet and creates the response IP packet for the received IP packet in operation S430.

The DNS server 403 searches for an IP address corresponding to the domain name included in the received IP packet. The DNS server 403 may have stored an IP address corresponding to the domain name. The DNS server 403 may search for an IP address corresponding to the received domain name by the IP information.

The DNS server 403 is capable of determining an edge server closest to a user based on an IP address of the terminal that transmitted the IP packet and the IP bandwidths allocated according to ISPs.

Therefore, the DNS server 403 may include an IP address, which corresponds to an edge server closest to a user, in the response IP packet.

The DNS server 403 creates the response IP packet and transmits the created response IP packet to the terminal 401 in operation S440.

The terminal 401 receives the response IP packet and accesses the edge server according to the IP address included in the IP packet to receive corresponding content therefrom in operation S450.

Figure 5:
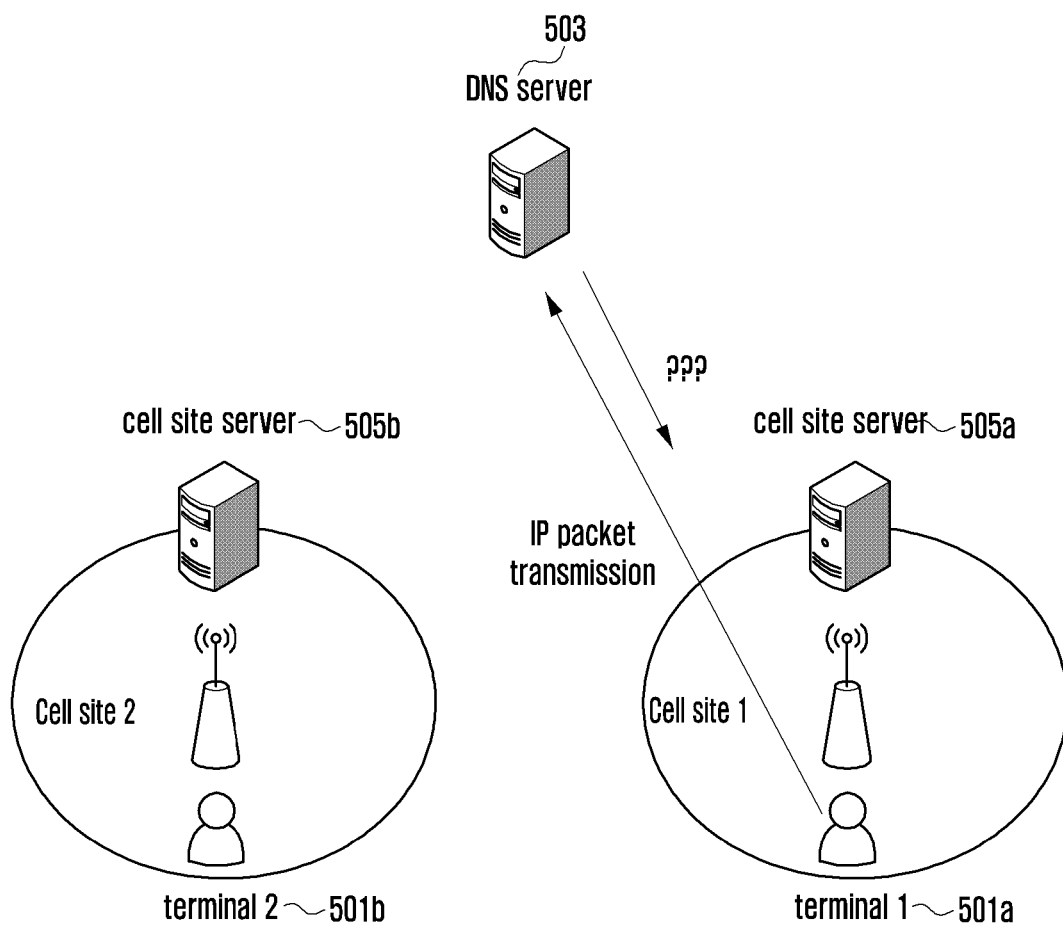
FIG. 5 is a diagram that illustrates a problem when a server is installed to a cell site according to an embodiment of the present disclosure.

FIG. 5 is a diagram that illustrates a problem when a server is installed to a cell site according to an embodiment of the present disclosure.

Referring to FIG. 5, according to an embodiment of the present disclosure, a server is installed in a cell site to provide fast network services and to reduce the network load. As a server is installed closer to a terminal than to an edge server, fast services can be provided to the user.

When servers are installed in a cell site (which are referred to as cell site servers), the DNS server 503 cannot distinguish between a cell site server closest to a user (called a proximity server) from other cell site servers.

For example, when a terminal 501a needs to receive a service, the DNS server 503 must allocate an IP address of a cell site server 505a, closest to the terminal 501a, to the terminal 501a.

However, since the DNS server 503 can detect only an edge server closest to a user based on the IP address of the terminal, which is included in the IP packet transmitted by the user, and the IP bandwidths allocated according to ISPs, the DNS server 503 cannot search for a cell site server closest to a terminal by using the information.

The following description provides a method for a DNS server to search for a cell site server closest to a user.

Figure 7:
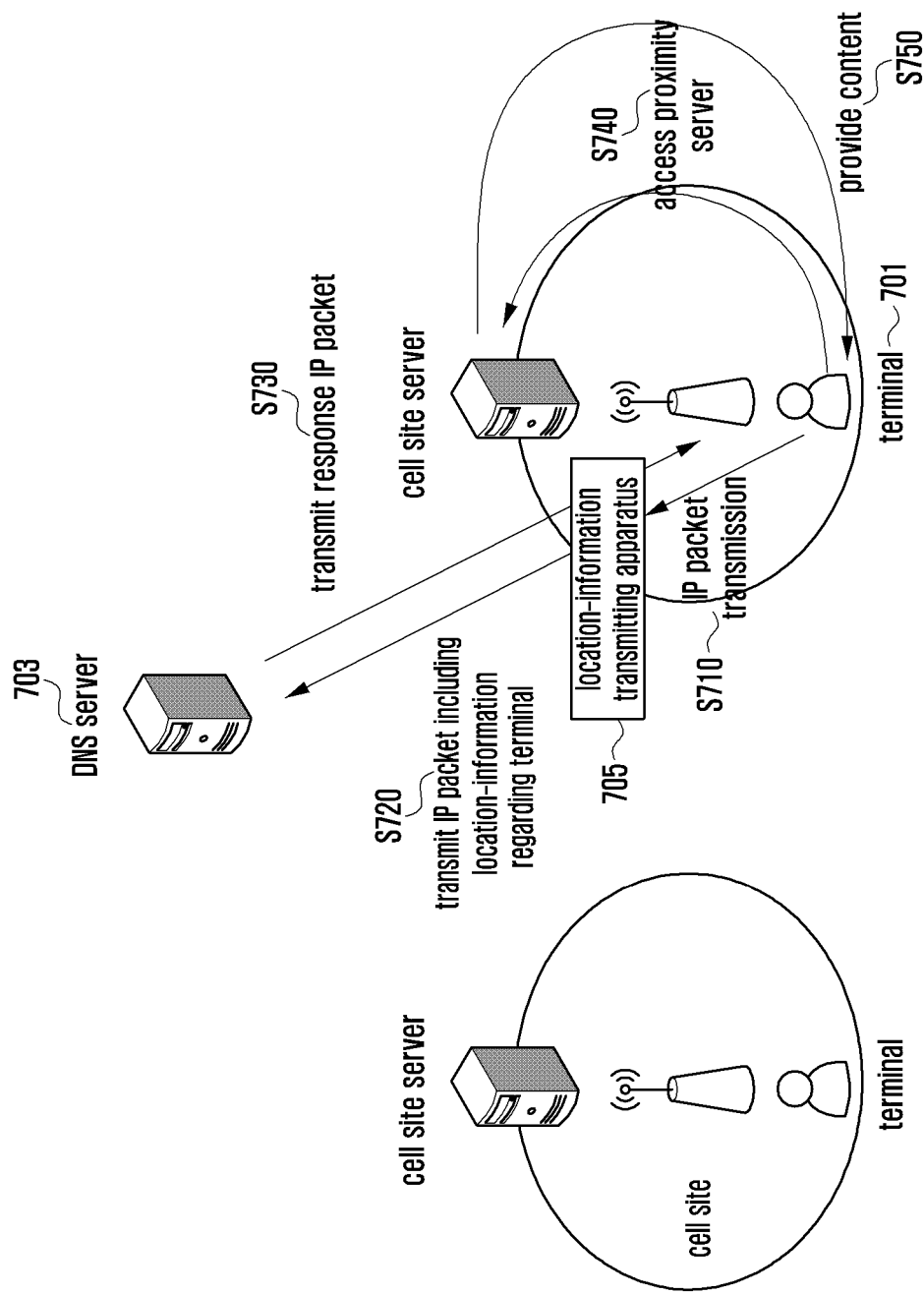
FIG. 7 is a diagram that illustrates a method for allocating a proximity server to a terminal using a location-information transmitting apparatus according to an embodiment of the present disclosure.

FIG. 7 is a diagram that illustrates a method for allocating a proximity server to a terminal using a location-information transmitting apparatus according to an embodiment of the present disclosure.

As described above, the proximity server refers to a server closest to a user from among the servers installed in a cell site.

Referring to FIG. 7, a user inputs a domain name into a terminal 701 to access a particular site.

The terminal 701 transmits an IP packet including a DNS query to the DNS server 703 in operation S710. The location-information transmitting apparatus 705 is capable of obtaining (or intercepting) the IP packet transmitted by the terminal 701. The location-information transmitting apparatus 705 may be installed in the path for transmitting IP packets and is capable of obtaining an IP packet from the path.

The terminal 701 is capable of transmitting IP packets to the location-information transmitting apparatus 705.

When obtaining an IP packet, the location-information transmitting apparatus 705 includes terminal location information in the IP packet and transmits the IP packet to the DNS server 503 in operation S720. That is, the location-information transmitting apparatus 705 injects the terminal location information into the IP packet and retransmits the packet.

After receiving the IP packet including the terminal location information, the DNS server 703 is capable of searching for the IP address of a server corresponding to the domain name included in the IP packet. The DNS server 703 also searches for a proximity server closest to a user from among the servers corresponding to the domain name, by using the terminal location information.

Therefore, the DNS server 703 is capable of transmitting, to the terminal, the response IP packet including the IP address of the proximity server in operation S730.

After receiving the response IP packet, the terminal 701 is capable of accessing the proximity server by using the IP address included in the response IP packet in operation S740. The proximity server is capable of providing content to the terminal 701 in operation S750.

Figure 8:
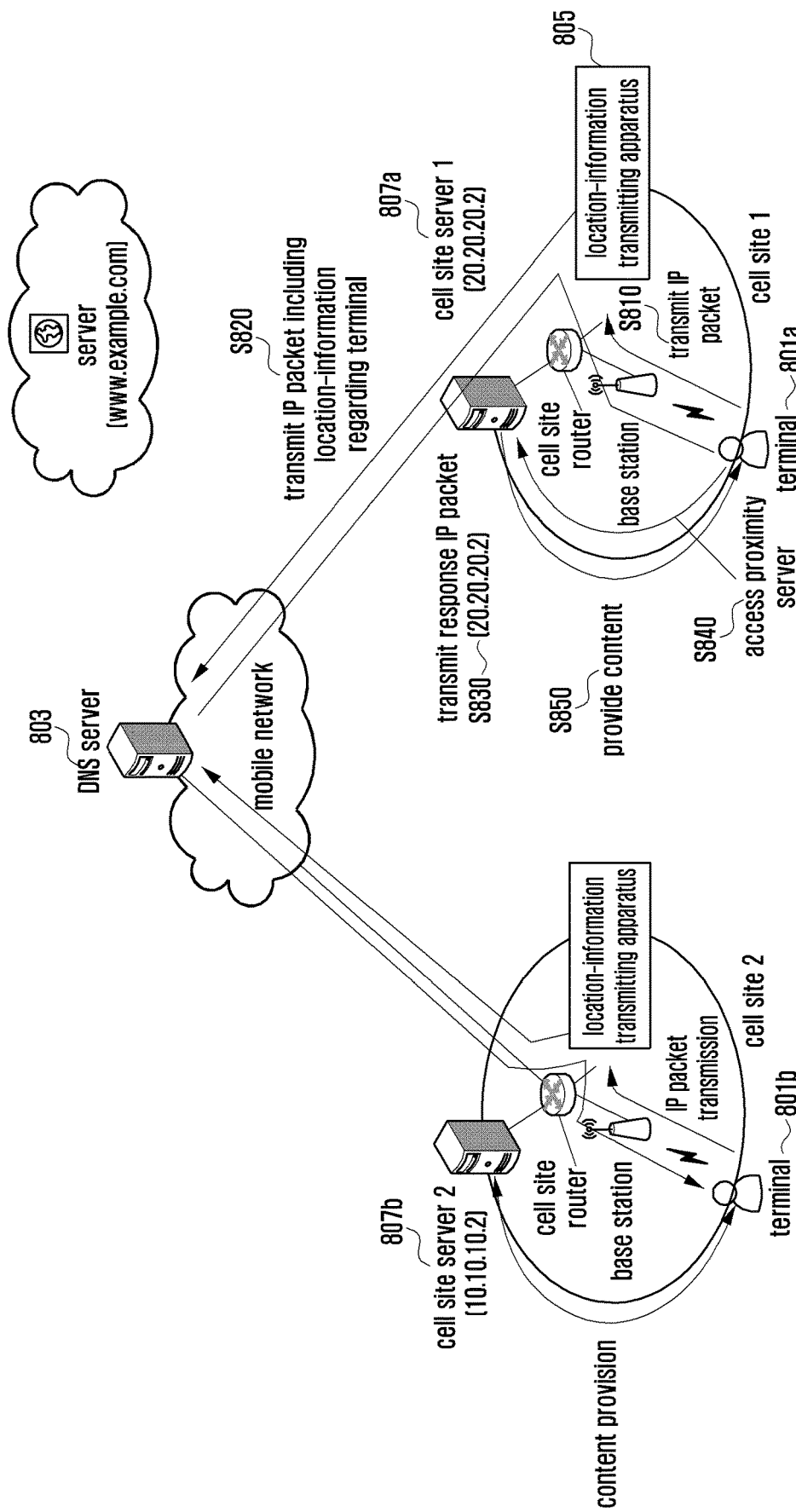
FIG. 8 is a diagram that illustrates a method for allocating a proximity server according to an embodiment of the present disclosure.

FIG. 8 is a diagram that illustrates a method for allocating a proximity server according to an embodiment of the present disclosure.

Referring to FIG. 8, a user inputs a domain name into a terminal 801a to access a particular site. After receiving the domain name, the terminal 801a transmits the IP packet including a DNS query to the DNS server 803 in operation S810. When the terminal 801a transmits the IP packet to the DNS server 803, the location-information transmitting apparatus 805 is capable of obtaining the IP packet from the terminal.

The terminal 801a is also capable of transmitting the IP packet including a DNS query to the location-information transmitting apparatus 805.

For example, to access the website of the Korean Intellectual Patent Office, the user inputs www.kipo.go.kr to the terminal. When the terminal receives the domain name, the domain name is included in the DNS query of the IP packet and then transmitted. The domain name may also be included in another part of the IP packet and then transmitted.

The location-information transmitting apparatus 805 transmits terminal location information to a DNS server so that the DNS server 803 can allocate a proximity server to a user. The location-information transmitting apparatus 805 may be installed in a network entity in an IP packet transmission path.

IP packets may be transmitted from a base station to the DNS server via network entities such as a router, a gateway, etc. Therefore, the location-information transmitting apparatus 805 may be installed in a base station, a router, a gateway, etc.

The location-information transmitting apparatus 805 may be installed, in the form of software such as a module, into one of the network entities located on a path transmitting IP packets. The location-information transmitting apparatus 805 may be implemented in the form of hardware to be installed to a path transmitting IP packets.

After obtaining an IP packet, the location-information transmitting apparatus 805 is capable of inserting terminal location information into the IP packet in operation S810.

The terminal location information may include a cell identifier where a terminal is located, a base station identifier of a cell where a terminal is located, a latitude and a longitude of where a terminal is located, etc. The terminal location information may also include an IP address of a proximity server, a cell site location-information, geographical location information of a terminal, identifiers of the location information, etc. The terminal location information may be created by the location-information transmitting apparatus 805 or received from a network entity.

The location-information transmitting apparatus 805 may insert the terminal location-information into part of the IP packet. For example, the location-information transmitting apparatus 805 may insert the terminal location information into the IP header of the IP packet, the UDP header, or the DNS message part.

When the terminal location information is inserted into the IP packet, the location-information transmitting apparatus 805 is capable of transmitting the IP packet including the terminal location information to the DNS server 803 in operation S820.

After receiving the IP packet including the terminal location information, the DNS server 803 is capable of transmitting, to the user, the response IP packet including the DNS response in operation S830.

The IP packet transmitted by the DNS server 803 may include an IP address of a proximity server as a cell site server closest to a user. The DNS server 803 searches for a proximity server by using the terminal location information included in the received IP packet, and creates the response IP packet including the IP address of the proximity server to transmit the created response.

For example, as shown in FIG. 8, when a user 801b needs to access a website, www.example.com, a server of the website may include cell site servers 807a and cell site server 807b. Since the proximity server of the terminal 801 is a cell site server 807a has an IP address of 20.20.20.2, the response IP packet may include an IP address, 20.20.20.2.

When the DNS server 803 transmits the response IP packet to the terminal in operation S830, the response IP packet may be transmitted to the terminal via a router, a base station, etc.

After receiving the response IP packet, the terminal may access a proximity server by using the IP address of the proximity server included the received response IP packet in operation S840. The proximity server is capable of providing content to the terminal in operation S850.

The location-information transmitting apparatus 805 is capable of allocation of the IP address of a proximity server to the terminal without participation of the DNS server. That is, when the location-information transmitting apparatus 805 receives the terminal location information including an IP address of a proximity server, the location-information transmitting apparatus 805 is capable of directly allocating the IP address of a proximity server to the terminal.

When the location-information transmitting apparatus 805 receives the terminal location information including an IP address of a proximity server, the location-information transmitting apparatus 805 is capable of transmitting the IP address of a proximity server to the DNS server 803 in operation S820. After receiving the IP address of a proximity server closest to the terminal, the DNS server 803 is capable of allocating the proximity server to the terminal by using the IP address of the proximity server.

When the terminal receives content via the proximity server, the service provider can reduce the load of network and the user can receive a high quality of service.

Figure 9:
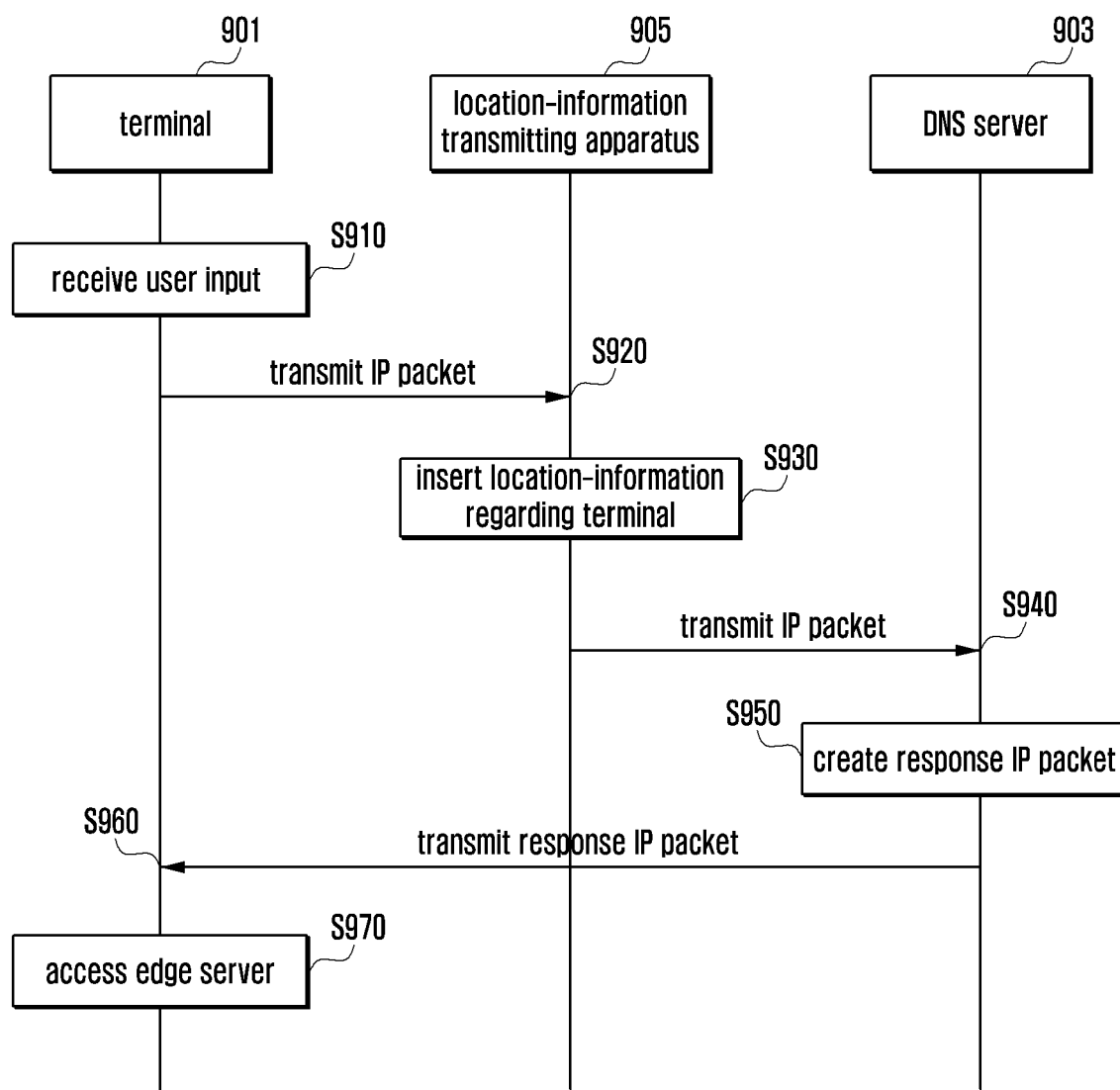
FIG. 9 is a flow diagram that illustrates a method for allocating a proximity server according to an embodiment of the present disclosure.

FIG. 9 is a flow diagram that illustrates a method for allocating a proximity server according to an embodiment of the present disclosure.

Referring to FIG. 9, the terminal 901 is capable of receiving a user input in operation S910.

After receiving the user input, the terminal 901 transmits an IP packet to the location-information transmitting apparatus 905 in operation S920. When the terminal 901 transmits IP packet to the DNS server 903, the location-information transmitting apparatus 905 obtains the IP packet in operation S920 as described above.

The location-information transmitting apparatus 905 inserts the terminal location information into the received IP packet in operation S930.

The terminal location information may include a cell identifier where a user is located, a base station identifier of a cell where a user is located, a latitude and a longitude of where a user is located, etc. The terminal location information may be directly created by the location-information transmitting apparatus 905 or received from a network entity.

When the location-information transmitting apparatus 905 inserts the terminal location information into an IP packet, it is capable of transmitting the IP packet to the DNS server 903 in operation S940.

The DNS server 903 receives the IP packet and creates the response IP packet to be transmitted to the terminal 901 in operation S950.

When the DNS server 903 creates the response IP packet, it is capable of searching for an IP address of a proximity server by using the terminal location information and the domain name included in the IP packet, and inserting the IP address of the proximity server into the response IP packet.

The DNS server 903 is also capable of searching for an IP address of a server corresponding to a domain name via the domain name included in the IP packet and an address of a server closest to a terminal from among the IP addresses corresponding to the domain name by using the terminal location information, and inserting the IP address of a server closest to the terminal to the response IP packet.

The response IP packet created by the DNS server 903 may include a DNS response, an IP address of a proximity server, etc.

After that, the DNS server 903 transmits the response IP packet to the terminal 901 in operation S960.

After receiving the response IP packet, the terminal 901 is capable of accessing the proximity server via the IP address included in the response IP packet and receiving content from the proximity server.

Figure 10:
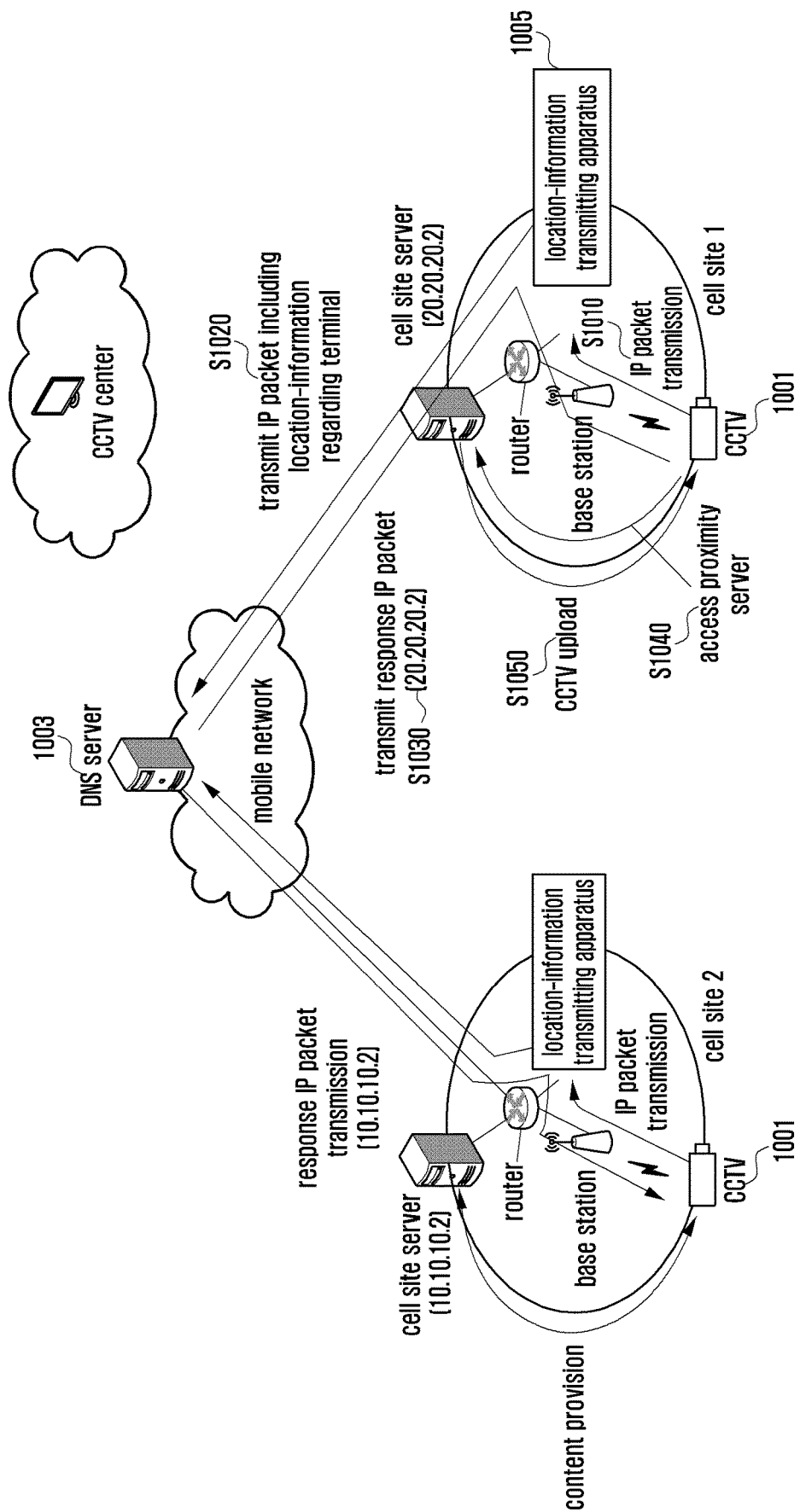
FIG. 10 is a diagram that describes a method of transmitting, to a server, a video taken by a closed-circuit television (CCTV) system, via a location-information transmitting apparatus according to an embodiment of the present disclosure.

FIG. 10 is a diagram that illustrates a method for transmitting video to a server via a location-information transmitting apparatus according to an embodiment of the present disclosure.

Referring to FIG. 10, video may be captured by a closed circuit television (CCTV) 1001 that is installed to a specific place for observing or monitoring a state or event such as traffic information, etc. Videos taken by a CCTV camera 1001 need to be stored in a CCTV server for a certain period of time. To this end, a CCTV camera transmits the respective taken videos to the CCTV server. In this case, the transmission of the CCTV videos to the server may employ the features of the present disclosure.

When CCTV cameras are installed and the CCTV videos are stored in a DNS server 1003, the videos may reduce storage capacity in the DNS server 1003 and may also lower the transmission speed to the DNS server 1003. Accordingly, the system is configured in such a way that a number of servers may be installed into a cell site and a CCTV camera transmits the video to a cell site server closest to the CCTV camera.

In order to transmit videos taken by a CCTV camera to a server, an administrator inputs, to the terminal, a domain name, e.g., cctv.example.com.

After receiving the user's input, the terminal is capable of transmitting an IP packet including a DNS query to the location-information transmitting apparatus 1005 in operation S1010. The IP packet may include the domain name.

The location-information transmitting apparatus 1005 is capable of inserting the CCTV camera location information into the IP packet. Since the embodiment is implemented in such a way that the CCTV camera is fixed, the CCTV camera serving as a terminal inserts the location information into the IP packet and transmits the IP packet to the DNS server 1003.

The CCTV location information or the terminal or location information may be inserted into part of the IP packet.

When the location-information transmitting apparatus 1005 inserts the terminal location information into an IP packet, the location-information transmitting apparatus 1005 is capable of transmitting the IP packet to the DNS server 1003 in operation S1020.

When receiving the IP packet, the DNS server 1003 is capable of creating the response IP packet to be transmitted to the terminal. The response IP packet may include a DNS response and an IP address of a proximity server. The DNS server 1003 searches for a proximity server by using the terminal location information included in the received IP packet, and then creates a response IP packet including the IP address of the proximity server.

The DNS server 1003 transmits the response IP packet to the terminal in operation S1030.

The terminal is capable of accessing a proximity server corresponding to the IP address included in the response IP packet in operation S1040. The terminal accesses the proximity server and uploads the CCTV video on the proximity server in operation S1050. The proximity server may transmit the uploaded video to a CCTV center for managing videos transmitted from CCTV cameras. The proximity server may also download a video from the CCTV server to provide the video to users.

As described above, the present disclosure is capable of allocating a proximity server to a terminal by using the terminal location information so that the terminal user can receive services from the proximity server. Therefore, the present disclosure is capable of providing the terminal user with a high quality of communication service and reducing the network load.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A location-information transmitting apparatus in a wireless communication system, the location-information transmitting apparatus comprising:
    a transceiver configured to communicate with other network entities; and
    a controller configured to:
        receive, from a terminal, a first internet protocol (IP) packet including a domain name system (DNS) query,
        insert location information into the first IP packet, wherein the location information includes an IP address of a first proximity server associated with a transmission path of the first IP packet,
        transmit, to a DNS server, the first IP packet including the location information and the DNS query,
        receive, from the DNS server, a second IP packet including an IP address of a second proximity server, wherein the second proximity server is determined based on the location information and the IP address of the first proximity server among at least one proximity server, and
        transmit, to the terminal, the second IP packet.

2. The location-information transmitting apparatus of claim 1,
    wherein the second proximity server is located closest to the terminal among the at least one proximity server, and
    wherein the IP address of the second proximity server is used for the terminal to access the second proximity server.

3. The location-information transmitting apparatus of claim 1, wherein the location-information transmitting apparatus is installed to one of other network entities located on the transmission path between the terminal and the DNS server.

4. The location-information transmitting apparatus of claim 1, wherein the controller is further configured to:
    insert the location information further into a User Datagram Protocol (UDP) header, Transmission Control Protocol (TCP), or a DNS message part, and
    transmit the first IP packet.

5. The location-information transmitting apparatus of claim 1, wherein the first IP packet comprises information to generate the location information to be transmitted to another DNS server via the DNS server.

6. The location-information transmitting apparatus of claim 1, wherein the location information further comprises at least one of cell site location information, geographical location information of the terminal, or an identifier of the location information.

7. A domain name system (DNS) server in a wireless communication system, the DNS server comprising:
    a processor configured to communicate with other network entities; and
    a controller configured to:
        receive, from a location-information transmitting apparatus, a first internet protocol (IP) packet including location information and a DNS query, wherein the location information including an IP address of a first proximity server associated with a transmission path of the first IP packet is inserted into the first IP packet by the location-information transmitting apparatus,
        determine a second proximity server based on the location information and the IP address of the first proximity server among at least one proximity server, and
        transmit, to the location-information transmitting apparatus, a second IP packet including an IP address of the second proximity server.

8. The DNS server of claim 7,
    wherein the second proximity server is located closest to a terminal among the at least one proximity server, and
    wherein the IP address of the second proximity server is used for the terminal to access the second proximity server.

9. The DNS server of claim 7, wherein the location-information transmitting apparatus is installed to one of other network entities located on the transmission path between a terminal and the DNS server.

10. The DNS server of claim 7, wherein the location information is further inserted into a User Datagram Protocol (UDP) header, Transmission Control Protocol (TCP), or a DNS message part.

11. The DNS server of claim 7, wherein the first IP packet comprises information to generate the location information to be transmitted to another DNS server via the DNS server.

12. The DNS server of claim 7, wherein the location information further comprises at least one of cell site location information, geographical location information of a terminal, or an identifier of the location information.

13. A method performed by a location-information transmitting apparatus in a wireless communication system, the method comprising:
    receiving, from a terminal, a first internet protocol (IP) packet including a domain name system (DNS) query;
    inserting location information into the first IP packet, wherein the location information includes an IP address of a first proximity server associated with a transmission path of the first IP packet;
    transmitting, to a DNS server, the first IP packet including the location information and the DNS query;
    receiving, from the DNS server, a second IP packet including an IP address of a second proximity server, wherein the second proximity server is determined based on the location information and the IP address of the first proximity server among at least one proximity server; and
    transmitting, to the terminal, the second IP packet.

14. The method of claim 13,
wherein the second proximity server is located closest to the terminal among the at least one proximity server, and
wherein the IP address of the second proximity server is used for the terminal to access the second proximity server.

15. The method of claim 13, wherein the location-information transmitting apparatus is installed to one of other network entities located on the transmission path between the terminal and the DNS server.

16. The method of claim 13, further comprising:
inserting the location information further into a User Datagram Protocol (UDP) header, Transmission Control Protocol (TCP), or a DNS message part; and
transmitting the first IP packet.

17. The method of claim 13, wherein the first IP packet comprises information to generate the location information regarding the terminal to be transmitted to another DNS server via the DNS server.

18. The method of claim 13, wherein the location information further comprises at least one of cell site location information, geographical location information of the terminal, or an identifier of the location information.

19. A method performed by a domain name system (DNS) server in a wireless communication system, the method comprising:
receiving, from a location-information transmitting apparatus, a first internet protocol (IP) packet including location information and a DNS query, wherein the location information including an IP address of a first proximity server associated with a transmission path of the first IP packet is inserted into the first IP packet by the location-information transmitting apparatus;
determining a second proximity server based on the location information and the IP address of the first proximity server among at least one proximity server; and
transmitting, to the location-information transmitting apparatus, a second IP packet including an IP address of the second proximity server.

20. The method of claim 19,
wherein the second proximity server is located closest to a terminal among the at least one proximity server, and
wherein the IP address of the second proximity server is used for the terminal to access and the second proximity server.

21. The method of claim 19, wherein the location-information transmitting apparatus is installed to one of other network entities located on the transmission path between a terminal and the DNS server.

22. The method of claim 19, wherein the location information is further inserted into a User Datagram Protocol (UDP) header, Transmission Control Protocol (TCP), or a DNS message part.

23. The method of claim 19, wherein the first IP packet comprises information to generate the location information to be transmitted to another DNS server via the DNS server.

24. The method of claim 19, wherein the location information further comprises at least one of cell site location information, geographical location information of a terminal, or an identifier of the location information.

\* \* \* \* \*